Figure 6:
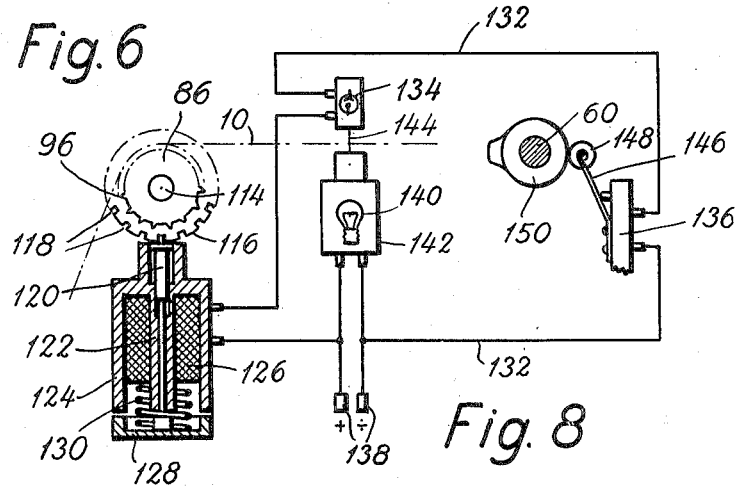

Jan. 31, 1961            J. H. LEMCHE            2,969,724
METHOD FOR THE PRODUCTION OF PRINTED MATTER TOGETHER
WITH TYPEWRITER AND PUNCHING MACHINE TO
BE USED IN CONNECTION THEREWITH
Filed April 19, 1957            4 Sheets-Sheet 1
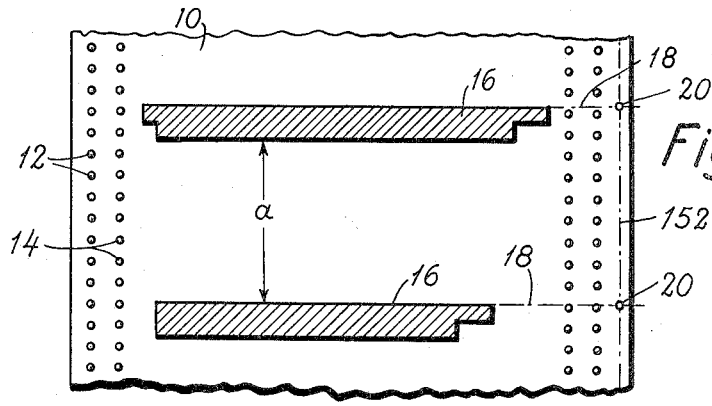
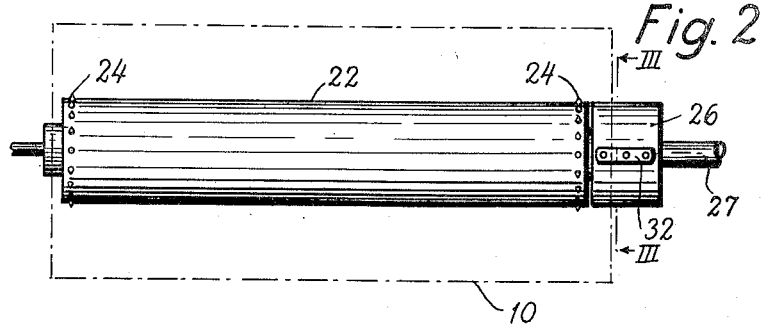
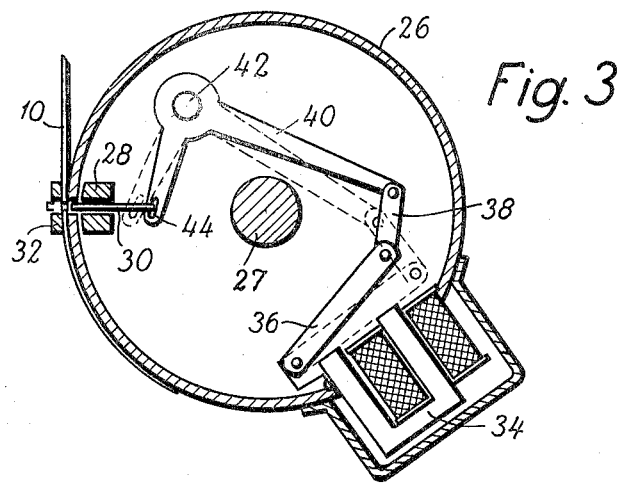
INVENTOR.
JOHAN HENRIK LEMCHE
BY
Irwin S. Thompson
ATTY.

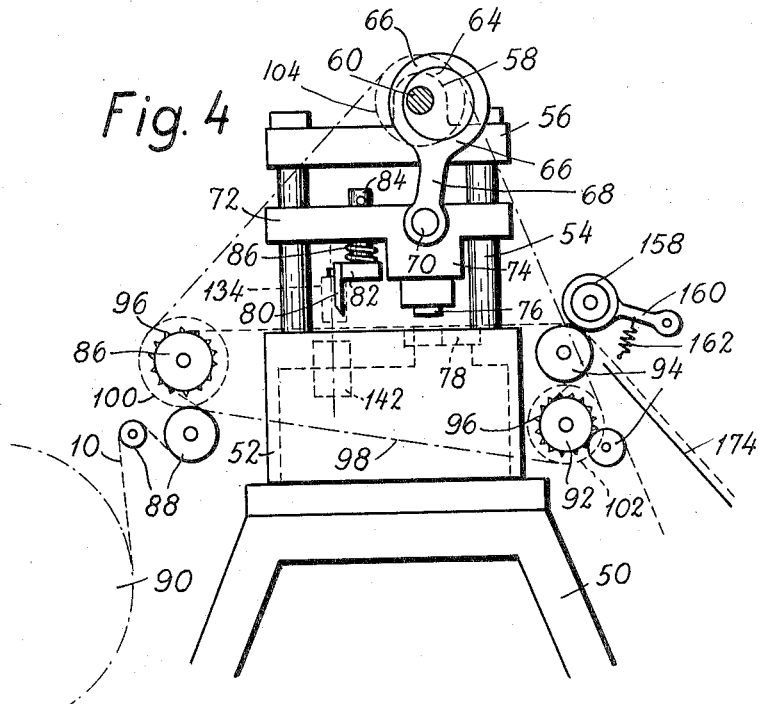
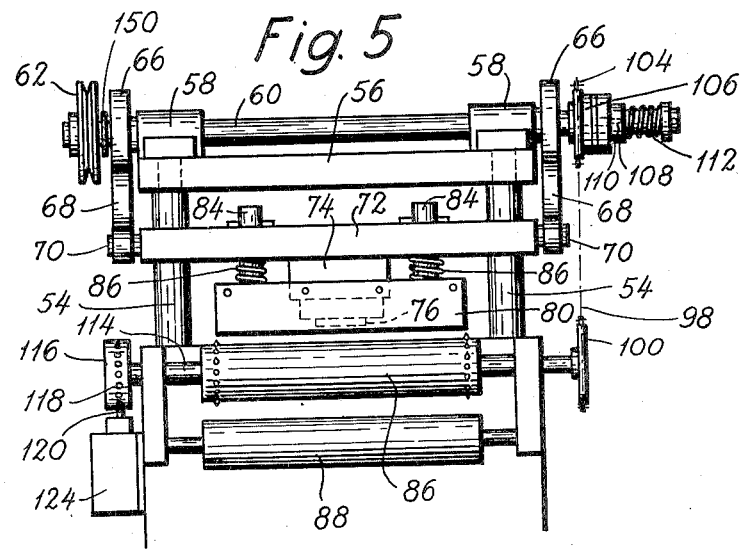

Jan. 31, 1961 J. H. LEMCHE 2,969,724
METHOD FOR THE PRODUCTION OF PRINTED MATTER TOGETHER
WITH TYPEWRITER AND PUNCHING MACHINE TO
BE USED IN CONNECTION THEREWITH
Filed April 19, 1957 4 Sheets-Sheet 3

INVENTOR.
JOHAN HENRIK LEMCHE
BY
Irvin S. Thompson
Atty.

United States Patent Office 2,969,724
Patented Jan. 31, 1961

---

2,969,724

METHOD FOR THE PRODUCTION OF PRINTED MATTER TOGETHER WITH TYPEWRITER AND PUNCHING MACHINE TO BE USED IN CONNECTION THEREWITH

Johan Henrik Lemche, Copenhagen, Denmark, assignor to Carl Allers Etablissement A-S, Copenhagen, Denmark, a Danish joint stock company Filed Apr. 19, 1957, Ser. No. 653,933

Claims priority, application Denmark Apr. 26, 1956

7 Claims. (Cl. 95—85)

The invention relates to a method for the production of printed matter, particularly periodically appearing publications, with the use of reproduction originals which, e.g. with a view to alteration of the text of subsequent issues, consist of text elements on separate cards. Typical examples of such printed matter, for which the method is preferably used, are directories, telephone directories, timetables, catalogues, price lists, inventories, registers, and the like.

For the preparation of the reproduction originals the cards are placed scale-like in rows, so that the text elements will form lines in a column or page of the pulblication, and are thereupon transferred by photochemical means, e.g. by photographing, to a reproduction pattern, the text image of which is transferred in known manner to a printing form by which the printing is effected according to usual methods, e.g. offset printing, deep printing, letterpress printing or other reproduction processes.

Hitherto, use has been made of slips or cards with one line of text only for the construction of the reproduction originals. This is not expedient if the printing of e.g. directories is concerned, in which the text for each person may comprise one or more lines, because in such case the aggregate text must be made up of several slips or cards, whereas naturally it is desirable to have as few as possible. It has been realized that it would be expedient to represent on each card all the text applying to one individual person, irrespective of the number of lines, but it has not been possible to reconcile this with a known system, in which the cards themselves contain means to provide mutual alignment of the cards when they are being placed together, flaps having been punched in the card material itself beyond the text area, behind which said flaps the edge of the preceding card can be inserted so as to determine the interspacing of the cards in vertical direction, whereas the lateral alignment is effected by means of a special rail, which is placed behind the cards and serves to support a row of cards thereby, the flaps being so shaped that they present vertical edges, which bear against stops on the rail.

The primary object of the invention is to avoid this difficulty by providing a method for use in connection with the production of printed matter in the manner mentioned above, in which it is possible to use cards with text elements with different height, for instance with a different number of text lines.

Another object of the invention is to indicate a method of the kind in question, by which the texts can be written on a continuous web, preferably by means of a typewriter, from which web the cards can be cut subsequently in such a way that each card will show the text element contained thereon and that the text elements will follow each other properly when subsequently put together.

In accordance with the method of the invention the text elements are disposed with suitable mutual intervals across a continuous band, the band is provided with a register mark for each text element, the position of said mark being determined in relation to the beginning of the text, and the cards are subsequently cut from the band by transverse cuts, the positions of which are determined by the register marks.

The text elements are suitably so disposed on the band that in the longitudinal direction of the band the same distance is maintained between the end of an arbitrary element and the beginning of the succeeding one, waste of material being thereby avoided, when the cards are cut from the band, as then consecutive text elements can be bisected in one cut.

If the invention is used in connection with cards with punched flaps, behind which, as mentioned in the foregoing, the edge of the preceding card can be inserted so as to fix the position of the cards in relation to each other, the said flaps are punched in all cards at a constant distance from the beginning of the text element, as measured in the longitudinal direction of the band. This will cause the text elements to be correctly positioned in relation to each other, irrespective of the number of their lines, when the cards are put together.

The transverse cuts through the band for the separation of the cards are preferably produced simultaneously with the punching of the flaps.

The invention furthermore comprises a punching machine for use in connection with the method indicated. The arrangement of said machines as indicated by the invention will be mentioned hereinafter.

Figure 8:
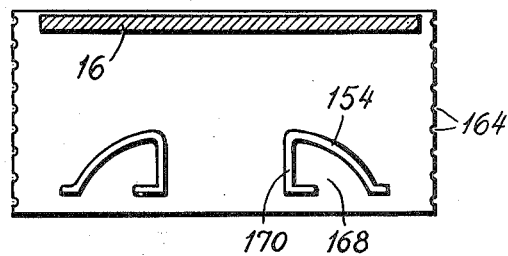
Figure 9:
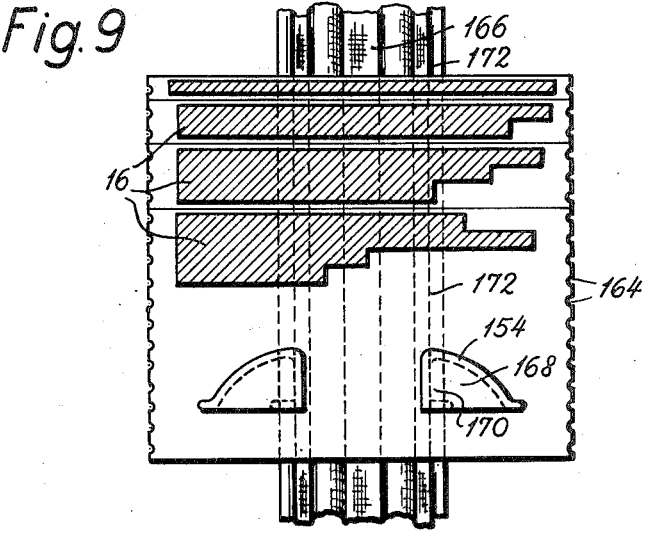
Figure 7:
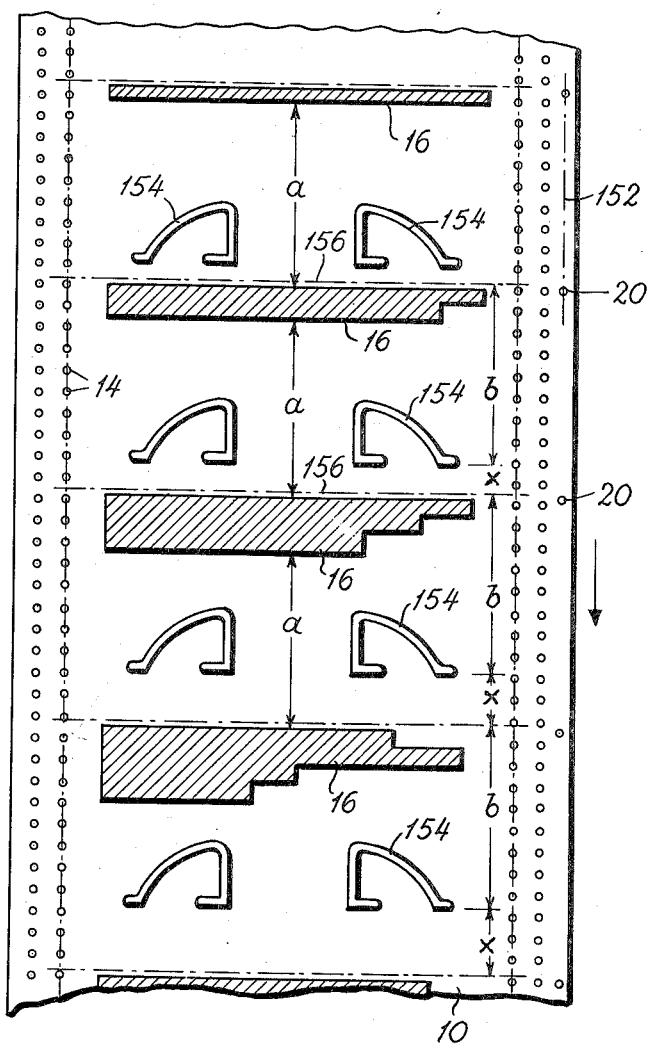

The invention will now be explained in detail with reference to the drawings, wherein:

Fig. 1 shows part of a band with text elements, as used in connection with the present invention, Fig. 2 is a front view of a platen for a typewriter according to the invention, Fig. 3 is a cross section on a larger scale on the line III—III in Fig. 2, Fig. 4 is a side view, partly schematical, of a punching machine according to the invention, Fig. 5 is a front view of the same, Fig. 6 shows a diagram for electrical control of the punching machine shown in Figs. 4 and 5, Fig. 7 shows a band with text elements, after having passed through the punching machine, Fig. 8 shows an individual card cut from the band, and Fig. 9 shows a number of cards piled scale-like on a rail, and together constituting part of a reproduction original.

The band shown in Fig. 1 consists of a length 10 of heavy paper or thin board or any other material suiting the purpose. At each lateral edge the band has perforations 12 and 14 in two rows, the outermost of which is designed to cooperate with rows of spikes on feed rollers, as will be mentioned in the following. Transversely of the band there are disposed texts 16, which are indicated by hatchings. In Fig. 1 each text comprises two lines. Simultaneously with the placing of the first line of each text, the band 10 is provided at its right-hand edge beyond the perforations with a registermark, which in the present case is in the form of a small aperture 20, but which might also have been e.g. a black mark on the paper. This aperture must have a certain position, as seen in the longitudinal direction of the band, in relation to the beginning of the appurtenant text or, more particularly, in relation to the first text line. It is indicated in Fig. 1 that the apertures 20 are on a line 18, which is tangent to the top of the letters in the uppermost line.

The text may have been written on a typewriter, as assumed in the following, but it may have been applied in any manner whatsoever.

In the case of a typewriter, use is made of a platen 22 which, as shown in Fig. 2, is provided at either end with a row of spikes 24, which are designed to cooperate with the perforations 12, so that the position of the band remains the same in the longitudinal direction of the platen. At the right-hand end of the platen there is provided a stationary drum 26, which surrounds the platen shaft 27, and which contains a perforation mechanism for the production of the apertures 20. This mechanism is operated from a key on the typewriter.

In Fig. 3 has been shown an embodiment of a perforating mechanism, which is actuated electrically, it being assumed that the typewriter in its entirety is controlled electrically. Inside the hollow drum 26 there is attached a block 28 with a radial hole, which forms a guide for a plunger 30, the foremost end of which extends into an aperture in the drum wall. To the exterior side of the drum a bracket 32 has been attached, see also Fig. 2, said bracket being provided with a hole, which forms a matrix for the plunger 30. One end of the bracket 32 is so spaced from the exterior wall of the drum that the edge of the paper band 10 can pass between the bracket and drum. The plunger 30 is actuated by an electromagnet 34 with a swingable armature 36, the free end of which is connected to the plunger 30 through a link 38 and a bell crank lever 40, which is swingable on a fixed pivot 42, the internal bent end of the plunger extending into a slot 44 at the end of one arm of the bell crank lever 40. When the electromagnet 34 is energized, the members 36, 38, and 40 are transferred to the positions shown in dotted lines, whereby a hole 20 is punched in the band 10.

The first step in the preparation of the reproduction original is writing the texts in question on the band 10 by the typewriter. Care is thereby to be taken that the same distance, as measured in the longitudinal direction of the band, is constantly maintained between the end, more particularly the last line, of the written text and the beginning, more particularly the first line, of the following text. This distance is denoted by *a* in Figs. 1 and 7. The object thereof will be explained in the following. When the first line of each text has been written, the corresponding hole 20 is punched.

A considerable length of the band can be covered with writing, the band being gradually wound on a drum, which is thereupon transferred to a punching machine, now to be described with reference to Figs. 4 and 5.

The punching machine comprises a frame 50, to which there is attached a base 52 in the form of an inverted box. From the upper side of the base four columns 54 rise, the upper ends of which are connected by means of a top plate 56. At its two sides the said plate carries bearings 58 for the driving shaft 60 of the machine, which is presumed to be driven by means of a V belt by way of a V belt pulley 62, shown in Fig. 5. Beyond the bearings 58 there are attached to the shaft 60 eccentric discs 64, Fig. 4, which are embraced by rings 66 of connecting rods 68, the lowermost ends of which embrace projections 70 at the sides of a plate 72, which will thus during the operation of the machine be moved upwardly and downwardly, sliding on the columns 54 which serve as parallel guides for the said plate.

The plate 72 has a downwardly protruding projection 74, to the lowermost face of which there is attached a patrix 76, which during the operation of the machine cooperates with a matrix 78, supported on the base 52. The plate 72 also serves to impart an upward and downward movement to a knife 80, having an edge facing downwards and extending transversely of the machine. The knife 80 is attached to a bar 82, from which there extend upwardly two projections 84, which can slide in corresponding holes through the plate 72. Between the latter and the bar 82 the projections are surrounded by coiled springs 86, which endeavour to push the bar and consequently the knife 80 in a downward direction. This arrangement enables the downward movement of the knife 80 to cease, when it hits the top face of the base 52, whereas the patrix 76 can continue its movement and cooperate with the matrix 78 in order to complete the desired punching operation.

At the front side of the punching machine there is provided a feed roller 86 for the band 10 together with two guide rollers 88. The drum on which the band is wound is denoted by 90. At the rear side of the machine there is also provided a feed roller 92 together with two guide rollers 94. Like the aforesaid platen 22 of the typewriter, the feed rollers 86 and 92 are provided with rows of spikes 96, which are designed to cooperate with the perforations 12 in the band 10. The band is passed over the said rollers as shown by a dotted line in Fig. 4. The rollers 86 and 92 are driven by a chain 98, chain wheels 100 and 102, respectively, being secured to their shafts and engaging the chain 98, which also engages a chain wheel 104 disposed on the driving shaft 60. This chain wheel, which is rotatable in relation to the shaft 60, forms one part 106 of a friction coupling the other part 108 of which by means of a wedge 110 is nonrotatable in relation to the shaft 60 but can be displaced towards the former coupling part by means of a coiled spring 112, surrounding the shaft 60.

As will be seen from Fig. 5, a disc 116 is attached to the shaft 114 of the roller 86, a series of holes 118 being provided at the circumference of the disc for cooperation with the end of a displaceable pin 120. Normally, this pin is in a retracted position, and thus it will not prevent the operation of the feed rollers 86 and 92 via the friction coupling 106, 108 from the driving shaft 60, but when the pin is pushed forwards, it will cooperate with one of the holes 118 and thus stop the feeding, whereas the punching machine otherwise will continue to run, the coupling parts 106 and 108 sliding in relation to one another.

The arresting mechanism formed by the members 116, 118, and 120 is actuated by electrical control, as will be described in the following with reference to Fig. 6.

In this figure the numerals 60, 86, 96, 114, 116, 118, and 120 have the same significance as before. The pin 120 is displaceably mounted in a tube 122, which is integral with a jacket 124, containing a magnet coil 126, which surrounds the tube 122. At the lowermost end of the pin 120 there is attached a cup-shaped magnet armature 128, which is normally pressed downwards by a coiled spring 130. The circuit, denoted 132, of the coil 126 includes a photo-electric cell 134 and a shielded switch 136, which is normally closed, and current is supplied from terminals 138. From these terminals current is also supplied to an electric lamp 140, which is placed in a closed housing 142, and which emits a ray of light 144 through the housing towards the photo-electric cell 134. In practice it will be necessary to have the photo-electric cell work via an amplifier or a relay, which has not been shown here, seeing that it makes no change in the principle of the arrangement. The switch 136 can be influenced by a spring 146, at one end of which there is provided a roller 148, running on a cam disc 150, which is attached to the shaft 60 immediately within the pulley 62, see Fig. 5. In Fig. 4 the positioning of the photo-electric cell 134 and the lamp housing 142 is shown in dotted lines.

As indicated in Fig. 6 the band 10 passes the said members 134 and 136 in such manner that it normally cuts off or weakens the ray 144. When the band is being fed, the ray moves over it following a line 152 through the holes 20, see Figs. 1 and 7, in the longitudinal direction of the band. When one of the said holes passes the light ray 144 the resistance of the photo-electric cell 134 will be diminished, and the current in the circuit 132 will be increased to such a degree that the armature 128 is attracted, whereby the pin 120 is advanced towards the circumference of the disc 116 and enters the first arriving hole 118. By this means the feeding of the band 10 is stopped, but the punching machine continues to run which causes two specially shaped slits 154 to be punched in the band by the punching tool 76, 78, whereas the knife 80 produces a cut 156 perpendicularly to the band, see Fig. 7. As the said tool and the knife are at a definite distance from one another in the travel direction of the band, the distance *b* between the foot of the slits 154 and the cut 156 will always be the same, as is indicated in Fig. 7. It should be noted that the band 10 at the arrangement described travels "backwards" through the punching machine, i.e. in the direction indicated in Fig. 7 by the arrow.

At the moment when the feeding is stopped, the cam disc 150 will be in the position shown in Fig. 6. When the driving shaft 60 has thereupon turned through about 180°, the cam disc 150 forces the roller 148 back, whereby the spring 146 opens the switch 136, so that the circuit 132 is broken, and the armature 128 is moved back by the spring 130. By this means the feeding of the band 10 is released, whereupon another operation is started.

The punching machine is so adjusted that the cuts 156 are produced immediately behind the uppermost line of text, i.e. above the said line, when the card is seen non-inverted from in front. As the hole 20 occupies a certain position in relation to the beginning of the text, and as the texts 16 have different numbers of lines, the distance *c* from the foot of the slits 154 to the succeeding cut 156 will vary with the number of lines on the card concerned.

Finally, the cards are cut off at the sides by means of a pair of circular knives 158, which are disposed on swingable arms 160, and which are pressed against the uppermost roller 94 by means of springs 162, as indicated in Fig. 4. The knives 158 are so positioned and interspaced that the cuts produced by them will extend through the middle of the perforations 14. This will cause the cut-off cards to be provided with semi-circular notches 164 at their lateral edges, see Fig. 8. The said notches serve to align the cards in relation to each other, partly when the cards are placed scale-like above each other, partly when several rows of such cards, placed side by side, are to be brought in register.

By the scale-like placing of the cards a metal rail 166 with a special profile, as indicated in Fig. 9, is used to support the cards. On account of the special shape of the slits 154 opposite flaps 168 are formed in the cards, which said flaps have vertical edges 170 facing each other. The said edges are passed behind the outermost lateral edges of the rail 166 and will bear against a shoulder 172 on the rail. When a card is placed above a card already in place, its lowermost edge will enter in front of the flaps 168, and when the card is pushed fully down, the said edge will bear against the foot of the slits 154, which thus constitutes an abutment. This is known per se. It is characteristic for the present invention, however, that the slits 154 are so positioned, depending upon the number of text lines, that the texts on the individual cards, when pushed together, will be so positioned in relation to each other that the same distance is always obtained between the lowermost line of a text and the uppermost line of the following text, as will appear from Fig. 9, which shows four cards with one, two, three, and four text lines, respectively. When the cards occupy the exact position in relation to each other, notches 164 in superposed cards will be flush with each other.

When the cards leave the punching machine, they slide down a chute 174, Fig. 4, while the marginal edges only of the band 10 are carried on over the feed roller 92 and the lowermost roller 94.

It is of no importance to the invention in what manner the texts on the cards have been produced, it being possible, e.g. for classified registers carrying advertisements, to insert such advertisements as a matter of course, whether they have been produced by drawing, block, photoprinting or in any other way.

When the cards have been placed in rows, as described, for the formation of columns or pages they form a reproduction original, which is photographed, whereby after development a reproduction pattern is produced, the further use of which can be in accordance with known methods of reproduction.

Having thus fully described my invention I claim as new and desire to secure by Letters Patent:

1. A scale-like assembly of overlapping cards for use in connection with the production of printed matter, the individual cards being provided at the top edge with a part of varying height of a reproduction original, represented in its entirety when the cards are positioned in overlapping position in a row, the height of the individual cards exceeding that of the appertaining part of the reproduction original by a part of constant height, each card being provided with flaps punched in said part at a constant distance from the top edge of the card, a varying amount of overlapping of the cards in the row being determined by engagement of the bottom edge of each card with the flaps in the succeeding card.

2. A scale-like assembly of overlapped cards for use in connection with the production of printed matter using reproduction originals composed of separate text elements, in which text elements of different heights are positioned, one on each card, at a constant distance from the top edge thereof, each card being provided with flaps punched therein at a distance from the bottom edge of the card varying with the height of the text element, the heights of the cards exceeding that of the appertaining text elements by a constant value.

3. A scale-like assembly of overlapped cards for use in connection with the production of printed matter using reproduction originals composed of separate text elements, in which text elements of different heights are positioned, one on each card at the top edge thereof, each card being provided with flaps punched therein at a distance from the bottom edge of the card varying with the heights of the text element, the height of the cards exceeding that of the appertaining text element by a constant value, the cards being positioned in a row in such manner that the bottom edge of each card intermeshes with the flaps in the succeeding card to determine a varying amount of mutual overlapping to make all text elements visible.

4. A method for use in connection with the production of printed matter using reproduction originals consisting of text elements on separate cards, comprising disposing text elements containing elements of different heights on a continuous web in such manner that in the longitudinal direction of said web the same distance is maintained between the end of an arbitrary element and the beginning of the succeeding one, punching flaps in said web for each text element at a constant distance from the beginning of each previous element, dividing said web by transverse cuts positioned at a constant distance from the beginning of each succeeding text element to form separate cards of varying heights, placing the cards scale-like in a row in such manner that the lower edge of each card intermeshes with and finds an abutment on the flaps of the succeeding card, and photographing the row of cards to form a reproduction pattern.

5. A method for use in connection with the production of printed matter using reproduction originals consisting of text elements on separate cards, comprising disposing text elements containing an arbitrary number of lines on a continuous web in such manner that in the longitudinal direction of said web the same distance is maintained between the last line of an arbitrary element and the first line of the succeeding one, producing flaps in said web for each text element at a constant distance from the first line of each previous text element, dividing said web by transverse cuts positioned at a constant distance from the first line of each succeeding text element to form separate cards of varying heights, placing the cards scale-like in a row in such manner that the lower edge of each card intermeshes with and finds an abutment on the flaps of the succeeding card, and photographing the row of cards to form a reproduction pattern.

6. A method for use in connection with the production of printed matter using reproduction originals consisting of text elements on separate cards, comprising disposing text elements containing an arbitrary number of lines on a continuous web by a manually controlled operation in such manner that in the longitudinal direction of said web the same distance is maintained between the last line of an arbitrary element and the first line of the succeeding one, producing flaps in said web for each text element at a constant distance from the first line of each previous text element, dividing said web by transverse cuts positioned at a constant distance from the first line of each succeeding text element to form separate cards of varying heights, placing the cards scale-like in a row in such manner that the lower edge of each card intermeshes with and finds an abutment on the flaps of the succeed-card, and photographing the row of cards to form a reproduction pattern.

7. A method for use in connection with the production of printed matter using reproduction originals consisting of text elements on separate cards, comprising disposing text elements containing an arbitrary number of lines on a continuous web by a manually controlled operation in such manner that in the longitudinal direction of said web the same distance is maintained between the last line of an arbitrary element and the first line of the succeeding one, producing flaps in said web for each text element at a constant distance from the first line of each previous text element, dividing said web by transverse cuts positioned at a constant distance from the first line of each succeeding text element to form separate cards of varying heights, placing the cards scale-like in a row in such manner that the lower edge of each card intermeshes with the flaps of the succeeding card, the said constant distances being so relatively chosen that in the row of cards the distance between the last line of an arbitrary element and the first line of the succeeding element is substantially equal to the distance between the lines on the elements, and photographing the row of cards to form a reproduction pattern.

References Cited in the file of this patent

UNITED STATES PATENTS

| | | |
|---|---|---|
| 1,048,056 | Fisher | Dec. 24, 1912 |
| 1,048,057 | Fisher | Dec. 24, 1912 |
| 1,400,634 | Steele | Dec. 20, 1921 |
| 1,694,517 | Ross | Dec. 11, 1928 |
| 2,150,016 | Wood | Mar. 7, 1939 |
| 2,216,585 | Burkart | Oct. 1, 1940 |
| 2,288,149 | Williams | June 30, 1942 |
| 2,394,558 | Miller et al. | Feb. 12, 1946 |
| 2,408,363 | Beckman et al. | Oct. 1, 1946 |
| 2,449,776 | Hess | Sept. 21, 1948 |
| 2,476,250 | Paulsen | July 12, 1949 |
| 2,480,781 | Simpson | Aug. 30, 1949 |
| 2,482,613 | Erickson | Sept. 20, 1949 |
| 2,521,435 | Wockenfuss | Sept. 5, 1950 |
| 2,609,613 | Capers | Sept. 9, 1952 |
| 2,706,944 | Claff et al. | Apr. 26, 1955 |